(12) United States Patent
Hooks et al.

(10) Patent No.: US 12,118,490 B1
(45) Date of Patent: Oct. 15, 2024

(54) WORKFLOW INSIGHT ENGINE AND METHOD

(71) Applicant: Pegasystems Inc., Cambridge, MA (US)

(72) Inventors: Dustin Jay Hooks, Lenexa, KS (US); Stephen Jacquemin, Mableton, GA (US); Jeremy Wetherford, Atlanta, GA (US)

(73) Assignee: Pegasystems Inc., Cambridge, MA (US)

( * ) Notice: Subject to any disclaimer, the term of this patent is extended or adjusted under 35 U.S.C. 154(b) by 433 days.

(21) Appl. No.: 17/204,085

(22) Filed: Mar. 17, 2021

Related U.S. Application Data

(60) Provisional application No. 63/032,625, filed on May 31, 2020, provisional application No. 63/032,485, filed on May 29, 2020.

(51) Int. Cl.
*G06Q 10/0633* (2023.01)
*G06F 11/34* (2006.01)
*G06F 16/21* (2019.01)
*G06Q 10/0639* (2023.01)

(52) U.S. Cl.
CPC ..... *G06Q 10/0633* (2013.01); *G06F 11/3438* (2013.01); *G06F 11/3447* (2013.01); *G06F 16/212* (2019.01); *G06Q 10/06393* (2013.01)

(58) Field of Classification Search
None
See application file for complete search history.

(56) References Cited

U.S. PATENT DOCUMENTS

| | | | |
|---|---|---|---|
| 7,313,564 B2 | 12/2007 | Melamed et al. | |
| 8,606,599 B1 * | 12/2013 | Wong | G16H 10/20 |
| | | | 705/2 |
| 8,856,746 B2 | 10/2014 | Mishra et al. | |
| 9,135,151 B2 | 9/2015 | Betak et al. | |
| 9,465,726 B2 | 10/2016 | Kozhuharov | |
| 9,600,401 B1 | 3/2017 | Haischt et al. | |
| 11,169,908 B1 * | 11/2021 | Lu | G06F 11/3608 |
| 2002/0077842 A1 * | 6/2002 | Charisius | G06Q 10/06312 |
| | | | 707/999.001 |

(Continued)

FOREIGN PATENT DOCUMENTS

WO   WO-2005106656 A2 * 11/2005  ............. G06Q 10/04

OTHER PUBLICATIONS

Kristian "Complexity metrics for Workflow nets", Dec. 2009, Information and Software Technology, pp. 610-626 (Year: 2009).*

(Continued)

*Primary Examiner* — Romain Jeanty
(74) *Attorney, Agent, or Firm* — PATENT LAW WORKS LLP

(57) ABSTRACT

A computer-implemented method is disclosed for generating insights for improving software workflows, where a workflow corresponds to a sequence of interactions of a user with one or more different user interface screens of software applications to perform a task. Attributes of the workflow associated with quality, efficiency and other attributes are measured by scoring aspects of the workflow and generating reports. The reports may also provide insights on opportunities to automate workflows.

13 Claims, 11 Drawing Sheets

(56) References Cited

U.S. PATENT DOCUMENTS

| | | | |
|---|---|---|---|
| 2003/0050800 A1* | 3/2003 | Brandt | G06F 8/34 |
| | | | 705/2 |
| 2003/0237053 A1 | 12/2003 | Chen et al. | |
| 2005/0203757 A1* | 9/2005 | Lei | G06Q 10/06 |
| | | | 705/7.27 |
| 2005/0268285 A1 | 12/2005 | Bagley et al. | |
| 2007/0022407 A1 | 1/2007 | Givoni et al. | |
| 2007/0130529 A1 | 6/2007 | Shrubsole | |
| 2009/0077422 A1 | 3/2009 | Khaladkar et al. | |
| 2009/0125362 A1* | 5/2009 | Reid | G06F 8/30 |
| | | | 705/7.27 |
| 2011/0035630 A1 | 2/2011 | Hayutin | |
| 2011/0202502 A1* | 8/2011 | Takatsu | G06Q 10/06 |
| | | | 707/E17.008 |
| 2013/0104041 A1* | 4/2013 | Seshagiri | G06F 11/3414 |
| | | | 715/704 |
| 2013/0339798 A1 | 12/2013 | Choudhary et al. | |
| 2016/0098662 A1* | 4/2016 | Voss | G06Q 10/06316 |
| | | | 705/7.26 |
| 2019/0026663 A1* | 1/2019 | Homeyer | G06Q 10/0633 |
| 2019/0102716 A1* | 4/2019 | Kass | G06Q 10/063116 |
| 2020/0356466 A1 | 11/2020 | Thangam | |
| 2021/0256076 A1 | 8/2021 | McMurray et al. | |

OTHER PUBLICATIONS

Steven "Success Story: Make the Electronic Health Record Work Easier and Cut Down on Daily Clicks" Aug. 2018, (Year: 2018).*

David "Workflow Management Coalition The Workflow Reference Model", Jan. 1995, The Workflow Management Coalition Specification, pp. 1-55 (Year: 1995).*

* cited by examiner

| Workflow | Path | Total Path Instances | Production Time + Other Time | Total Execution Time | Efficiency |
|---|---|---|---|---|---|
| WF-1 | WF-1-A | 5 | 5 | 10 | 50 |
| | WF-1-A | | 7 | 10 | 70 |
| | WF-1-A | | 8 | 11 | 73 |
| | WF-1-A | | 6 | 10 | 60 |
| | WF-1-A | | 8 | 10 | 80 |
| | WF-1-B | 3 | 8 | 16 | 50 |
| | WF-1-B | | 8 | 14 | 57 |
| | WF-1-B | | 9 | 14 | 64 |
| | WF-1-C | 1 | 9 | 15 | 60 |
| | WF-1-D | 2 | 5 | 15 | 33 |
| | WF-1-D | | 5 | 15 | 33 |
| Total (1) | | | | | 57 |
| WF-2 | WF-2-A | 3 | 6 | 9 | 67 |
| | WF-2-A | | 5 | 10 | 50 |
| | WF-2-A | | 4 | 11 | 36 |
| | WF-2-B | 3 | 7 | 10 | 70 |
| | WF-2-B | | 8 | 19 | 42 |
| | WF-2-B | | 6 | 15 | 40 |
| | WF-2-C | 1 | 4 | 14 | 29 |
| Total (2) | | | | | 48 |
| WF-3 | WF-3-A | 2 | 5 | 7 | 71 |
| | WF-3-A | | 5 | 8 | 63 |
| | WF-3-B | 1 | 5 | 6 | 83 |
| | WF-3-C | 1 | 4 | 8 | 50 |
| Total (3) | | | | | 67 |

Figure 9

| | | | A | | B | C | D | |
|---|---|---|---|---|---|---|---|---|
| Workflow | Path | Total Path Instances | KeyPresses + Clicks + Scrolls | Num Steps | min(Num Steps * 36.5, 277) | A / B | min (C, 1) | Friction Score (100 - (100 * D)) |
| WF-1 | WF-1-A | 5 | 100 | 3 | 109.5 | 0.91 | 0.91 | 8.68 |
| | WF-1-A | | 50 | 3 | 109.5 | 0.46 | 0.46 | 54.34 |
| | WF-1-A | | 10 | 3 | 109.5 | 0.09 | 0.09 | 90.87 |
| | WF-1-A | | 10 | 3 | 109.5 | 0.09 | 0.09 | 90.87 |
| | WF-1-A | | 6 | 3 | 109.5 | 0.05 | 0.05 | 94.52 |
| | WF-1-B | 3 | 50 | 5 | 182.5 | 0.27 | 0.27 | 72.60 |
| | WF-1-B | | 10 | 5 | 182.5 | 0.05 | 0.05 | 94.52 |
| | WF-1-B | | 5 | 5 | 182.5 | 0.03 | 0.03 | 97.26 |
| | WF-1-C | 1 | 5 | 3 | 109.5 | 0.05 | 0.05 | 95.43 |
| | WF-1-D | 2 | 10 | 5 | 182.5 | 0.05 | 0.05 | 94.52 |
| | WF-1-D | | 5 | 5 | 182.5 | 0.03 | 0.03 | 97.26 |
| Total (11) | | | | | | | | |
| WF-2 | WF-2-A | 3 | 100 | 7 | 255.5 | 0.39 | 0.39 | 60.86 |
| | WF-2-A | | 50 | 7 | 255.5 | 0.20 | 0.20 | 80.43 |
| | WF-2-A | | 10 | 7 | 255.5 | 0.04 | 0.04 | 96.09 |
| | WF-2-B | 3 | 200 | 8 | 277 | 0.72 | 0.72 | 27.80 |
| | WF-2-B | | 100 | 16 | 277 | 0.36 | 0.36 | 63.90 |
| | WF-2-B | | 50 | 32 | 277 | 0.18 | 0.18 | 81.95 |
| | WF-2-C | 1 | 7 | 5 | 182.5 | 0.04 | 0.04 | 96.16 |
| Total (7) | | | | | | | | |
| WF-3 | WF-3-A | 2 | 1000 | 4 | 146 | 6.85 | 1.00 | 0.00 |
| | WF-3-A | | 10000 | 4 | 146 | 68.49 | 1.00 | 0.00 |
| | WF-3-B | 1 | 10 | 2 | 73 | 0.14 | 0.14 | 86.30 |
| | WF-3-C | 1 | 2 | 2 | 73 | 0.03 | 0.03 | 97.26 |
| Total (4) | | | | | | | | |

- A = Key presses + Clicks + Scrolls
- B = min (Num Steps * 36.5, 277)
- C = A / B
- D = min (C, 1)
- Friction Score = 100 − 100 * D

Figure 10

| Workflow | Path | A Unique App Screen | B Total App Screen | C A/B | D min (Num Steps * 2, 6) | E min (B, D) / D | Complexity Score (100 - 100 * C * E) |
|---|---|---|---|---|---|---|---|
| WF-1 | WF-1-A | 1 | 3 | 0.33 | 6.00 | 0.50 | 83.33 |
| | WF-1-A | 2 | 3 | 0.67 | 6.00 | 0.50 | 66.67 |
| | WF-1-A | 3 | 3 | 1.00 | 6.00 | 0.50 | 50.00 |
| | WF-1-A | 2 | 3 | 0.67 | 6.00 | 0.50 | 66.67 |
| | WF-1-A | 1 | 3 | 0.33 | 6.00 | 0.50 | 83.33 |
| | WF-1-B | 1 | 8 | 0.13 | 6.00 | 1.00 | 87.50 |
| | WF-1-B | 5 | 8 | 0.63 | 6.00 | 1.00 | 37.50 |
| | WF-1-B | 7 | 8 | 0.88 | 6.00 | 1.00 | 12.50 |
| | WF-1-C | 1 | 4 | 0.25 | 6.00 | 0.67 | 83.33 |
| | WF-1-D | 2 | 5 | 0.40 | 6.00 | 0.83 | 66.67 |
| | WF-1-D | 2 | 5 | 0.40 | 6.00 | 0.83 | 66.67 |
| Total (11) | | | | | | | 66.62 |
| WF-2 | WF-2-A | 6 | 6 | 1.00 | 6.00 | 1.00 | 0.00 |
| | WF-2-A | 1 | 6 | 0.17 | 6.00 | 1.00 | 83.33 |
| | WF-2-A | 5 | 6 | 0.83 | 6.00 | 1.00 | 16.67 |
| | WF-2-B | 4 | 7 | 0.57 | 6.00 | 1.00 | 42.86 |
| | WF-2-B | 4 | 7 | 0.57 | 6.00 | 1.00 | 42.86 |
| | WF-2-B | 3 | 7 | 0.43 | 6.00 | 1.00 | 57.14 |
| | WF-2-C | 1 | 3 | 0.33 | 6.00 | 0.50 | 83.33 |
| Total (7) | | | | | | | 46.60 |
| WF-3 | WF-3-A | 2 | 2 | 1.00 | 4.00 | 0.50 | 50.00 |
| | WF-3-A | 2 | 2 | 1.00 | 4.00 | 0.50 | 50.00 |
| | WF-3-B | 1 | 2 | 0.50 | 4.00 | 0.50 | 75.00 |
| | WF-3-C | 1 | 2 | 0.50 | 4.00 | 0.50 | 75.00 |
| Total (4) | | | | | | | 62.50 |

- A = Unique App Screen
- B = Total App Screen = Num Steps
- C = A / B
- D = min (Num Steps * 2, 6)
- E = min (B, D) / D
- Complexity Score = 100 − 100 * C * E

Figure 11

WORKFLOW INSIGHT ENGINE AND METHOD

CROSS-REFERENCE TO RELATED APPLICATIONS

This application claims priority to U.S. Provisional Application Ser. No. 63/032,485, filed May 29, 2020, and U.S. Provisional Application Ser. No. 63/032,625, filed May 31, 2020, each of which are hereby incorporated herein in their entirety by this reference.

FIELD OF THE INVENTION

The present disclosure generally relates to evaluating patterns in software workflows and providing insights on how users interact with one or more software applications, such as a spreadsheet application, note taking application, and a customer relationship management application.

BACKGROUND

In many businesses, employees navigate between different software applications. For example, an employee of company "A" may be involved in customer service. But to service a customer question or complaint, there may be a variety of different software applications that a company may provide to its employees. The software applications may, for example, be supported by a company enterprise server or be available on the cloud.

There may be more than one way for an employee to use different software applications to perform a given task. For example, in a workflow to service a customer service question, an employee might conceivably use different software applications to complete the process of responding to a customer query and taking appropriate action. There may also be a variation in how individual employees use a set of software applications to complete a task because of different degrees of experience, training, and skill using software applications.

Some workflows may require more steps than others. For example, a workflow to handle a customer service request to change their contact information may have fewer steps than a workflow for claims processing.

A workflow for an employee to perform a given task may include the user navigating to different user interface screens of one or more different software applications and the user entering commands and data through mouse-clicks, keyboard presses, copies, pastes, etc. Also, there may be different paths for a user to navigate and interact with screens of individual software applications to complete a task.

However, these user choices create potentials for inefficiency or errors. For example, individual users may make mistakes in using different software applications or interact inefficiently with the software that they use.

However, there haven't been effective software tools to evaluate workflows of employees. Conventionally, only limited data on gross statistical metrics has been available to summarize gross average metrics regarding software applications used in workflows.

SUMMARY

A method and system is disclosed for generating insights for improving software workflows, where a workflow corresponds to a sequence of interactions of a user with one or more different user interface screens of software applications to perform a task. In one implementation, attributes of the workflow associated with quality, efficiency and other attributes are measured by scoring aspects of the workflow and generating reports. The reports may also provide insights on opportunities to automate workflows.

A example of a computer-implemented method includes monitoring instances of a workflow associated with user-interactions with user interfaces of one or more software applications used to perform a task. The workflow is scored based on at least one scoring rule to evaluate the workflow. A message is generated reporting on one or more workflow patterns identified by the scoring.

In one example, the scoring includes generating a metric for the workflow associated with at least one of: 1) an efficiency metric of the workflow, 2) a waste metric of the workflow associated with a user interrupting a workflow with non-work related activities; 3) a complexity metric of the workflow, and 4) a friction metric indicative of a level of user effort associated with keystrokes and mouse clicks required by the workflow.

In one example of a computer implemented method, parameters of a data model schema are configured to execute a query against structured data associated with user-interactions with one or more software applications to generate insights about patterns of use associated with a workflow. The query is executed to collect structured data associated with the workflow, score the workflow based on at least one rule, and generate a message providing one or more insights about patterns associated with the workflow.

In one example of a computer implemented method, instances of a workflow are monitored associated with user-interactions with user interfaces of one or more software applications used to complete a task. The workflow is scored based on at least one scoring rule to evaluate the workflow. An insight is generated about at least one problem with at least one workflow pattern identified by the scoring. An opportunity is reported, based on the insight, to automate at least a portion of the workflow associated with the at least one problem.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIG. 9 illustrates an example of a table showing efficiency scores for different workflows and paths in accordance with an implementation.

FIG. 10 illustrates an example of a table showing friction scores for different workflows and paths in accordance with an implementation.

FIG. 11 illustrates an example of a table showing complexity scores for different workflows and paths in accordance with an implementation.

DETAILED DESCRIPTION

Figure 1:
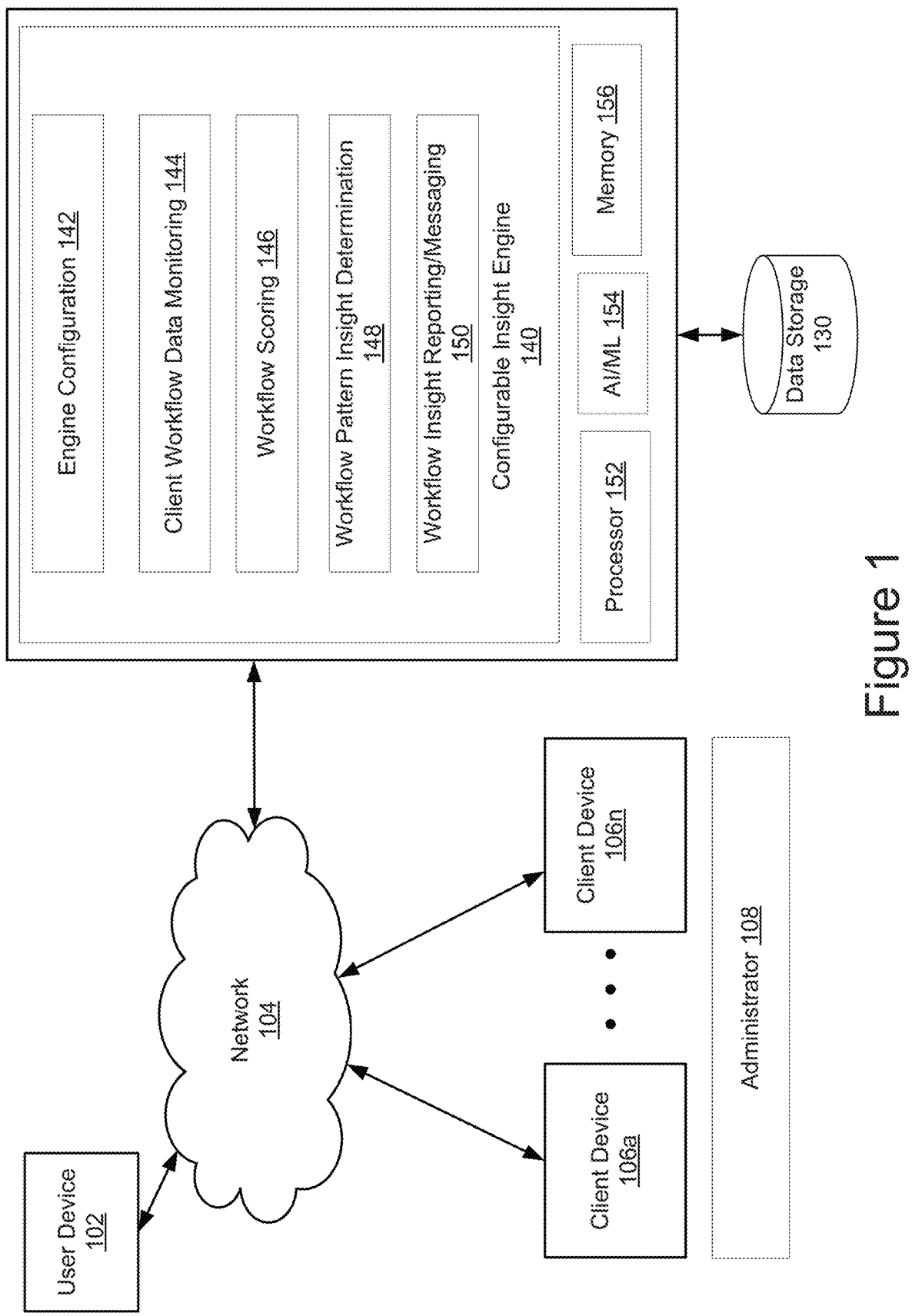
FIG. 1 is a block diagram illustrating an example of a system that includes an insight engine in accordance with an implementation.

Examples of the disclosure include systems and methods to evaluate workflows and identify insights in terms of recognizing patterns that can be discovered from structured data associated with the use of software applications to perform tasks by one or more users. The insights may be used for various purposes, such as to identify training issues and to identify opportunities for software upgrades or workflow automation.

An individual enterprise entity may have one or more workflows to perform different tasks. For example, a claims department in an insurance company might have dozens of different workflows associated with common customer service issues, with each workflow addressing different tasks (e.g., a change in contact information workflow, an auto accident claim initiation workflow, a customer claim question handling workflow, a customer claim complaint handling workflow, etc.). A workflow can have one or more instances. For example, the same employee may perform the same workflow multiple times over some given time period (e.g., over one month). However, other employees could also perform the same workflow. An individual workflow may include one or more paths. A workflow instance can include one or more steps. A path can also include one or more steps.

Some examples of insight categories include identifying patterns in workflows related to complexity, efficiency, quality, and friction. Complexity refers to a workflow having too many steps, too many different applications, or too many unique screens required for a workflow. A complex workflow may be more difficult for a user to consistently and accurately complete without errors. For example, if a complexity of a workflow is far above an average complexity than other workflows, the workflow may be a candidate for automation. Efficiency refers to workflows that contain waste in the sense of unproductive steps or interruptions. Workflows that have an efficiency below a threshold efficiency may be a candidate for automation. Quality refers to workflows that have a potential for errors or that over multiple instances result in many errors. Quality may also refer to industry-standard metrics of quality. For example, one or more software applications used in a workflow may have a potential for user errors or otherwise generate quality issues. Friction refers to the number of keystrokes and mouse clicks a user may execute to implement a workflow. Workflows that require fewer keystrokes and mouse clicks to implement the same task have less user labor (e.g., mouse clicking 20 times in a workflow versus 10 times in a workflow).

Individual scores and insights may be generated in the form of messages or longer reports. This may include individual scores for a workflow but it may also include a textual summary and recommendations. For example, the textual summary may identify specific issues associated with individual workflows and paths. Recommendations for automating individual workflows may also be provided. Details drill down data may also be provided.

In some implementations, the scoring algorithms may be generated based on structured data collected from the time-series data of workflows. For example, the scoring algorithms may be based on heuristic rules derived from empirical studies of workflows. Thresholds may be established for more scores to grade workflows and identify problems. In some examples, the generated insights may include recommendations to consider automating part or all of a workflow. Exemplary systems, methods, and data models are described below in more detail.

High Level System Example

FIG. 1 is a high level block diagram of a system to monitor workflows of users and score the workflows for metrics from which insights about the workflows can be determined. In one implementation, configurable insight engine 140 may be implemented as a network server with a processor 152, memory 156, and data storage 130. However, more generally, the configurable insight engine 140 may be implemented as a cloud-based service or a service leveraging off of cloud-based services.

In one implementation of a high-level system, the configurable insight engine 140 is implemented as computer software instructions stored on a computer readable medium and executable by one or more processors in a network server having a network interface and other features to communicate with client devices.

Individual users at client device 106*a* to 106*n* have access (e.g., through a browser) to user interface screens of software applications. This may include, as examples, note-taking applications, Excel® spreadsheet applications, word processing applications, email applications, social media applications, customer relationship management (CRM) applications, etc.

As an illustrative but non-limiting example, a user at a user device 102 may have a problem, query, complaint, etc. to be addressed by an employee at a client device 106. An individual instance of workflow may correspond to a sequence of interactions with user interface screens of one or more software applications to achieve a work task. However, more generally there may be multiple instances of the same workflow, although in individual instances of the workflow there may be a variation in the path or in non-essential steps required to achieve the task of the workflow.

In principal, individual users of client devices could receive messages providing insights about their workflows. However, in some implementations, an administrator/analyst 108 of a company receives insight messages about the workflows.

In one implementation, the configurable insight engine 140 interacts with client devices 106 via a network 104. The time-series data associated with the use of individual client devices may be collected by configurable insight engine 140 and, for example, stored in data storage 130 as workflow data. The raw time series data may be collected as structured data in different ways, such as by real-time monitoring and collecting structured data via network 104. For example, the relevant data to be collected may be tagged to facilitate collection. However, more generally, the raw time series data could be initially collected locally (e.g., by an enterprise server associated with the client devices 106). Also, as it is the interactions with application user interface screens and user interface controls that need to be recorded, macros may be defined to record information relevant to analyzing workflows but ignore sub-processes in order to reduce the amount of data that needs to be collected and recorded. Consequently, it will be understood that there are many possible variations on the process for collecting data.

In one implementation, an engine configuration module 142 permits configuration of various parameters regarding input fields describing user devices and software applications to be evaluated, output fields, categories and descriptions of scoring, analysis to be performed, and messages to be generated. In some implementations, the engine configuration module 142 configures configurable tables of a data model schema as discussed below in more detail.

In one implementation, a client workflow data monitoring module 144 monitors workflows of client devices 106. This may include, for example, collecting time-series data regarding software applications used, screen titles and content, time duration (e.g., how long the user views particular screens or takes to implement interactions), mouse clicks, keyboard-presses, copies, pastes, and other metrics. The time-series data may be evaluated to identify metrics such as average duration of a workflow, average number of key-presses, copies, pastes, scrolls, and mouse clicks. In one implementation, all relevant interactions against user interface application controls are recorded.

An AI/ML engine 114 may be included to aid in analyzing the resulting collected data. In some implementations, the AI/ML engine 114 may be trained to aid in analyzing the collected data. In some implementations, the AI/ML engine 114 may also be trained to automate workflows based on insights from the configurable insight engine 140.

In one implementation, a workflow scoring module 146 scores the data that is collected based on using one or more rules to generate metrics associated with workflow performance. The metrics aid in determining insights in workflow patterns. In one implementation, an insight determination module 148 identifies insights based on all of the available scores and may also determine if individual scores satisfy a pre-selected threshold level. Cumulative scores may also be determined based on a set of individual scores.

The workflow pattern insight determination module 148 may also take into consideration the number of workflow instances for a given type of tasks over a selected time period. Other attributes of workflows, such as a number of steps, may also be considered. Trends may also be identified, such as trends regarding whether metrics of scoring are improving, remaining stable, or becoming worse over time. That is, as insights generally correspond to discoverable patterns in workflows, there may be at different levels of granularity in terms of patterns based on individual scores, combination of scores, historical storing data for individual users, historical scoring data for groups of users, and dynamic scoring for individuals and for groups.

In one implementation, a workflow insight reporting/messaging module 150 generates reports or messages. These reports and messages may, for example, be provided to an administrator or analyst. They may also be used to determine workflows that may be beneficially automated, such as workflows that are inefficient or of poor quality. In some implementations, the reports or messages may also be used to automatically identify workflows to be automated.

Configurability Examples

In one implementation, a relational data model schema is used to generate queries on structured data to have insights evaluated, based on scoring algorithms, and generate messages. This permits a highly configurable approach to be used. In particular, one or more parameterized algorithms may be implemented as queries applied to a known structure of data. Input fields may be used to represent the instance values to use for specific execution of an insight, such as threshold values on which an insight is based, a date range on which to include data to be targeted by the insight, etc. Output fields represent the data generated by the insight execution. An insight message is resolved based on the output fields generated. A collection of the structured data captured as part of the insight execution may be generated as a drilldown.

The query may be implemented in SQL or other suitable query languages. Other aspects of the process may be implemented using a relational data base schema.

Figure 2:
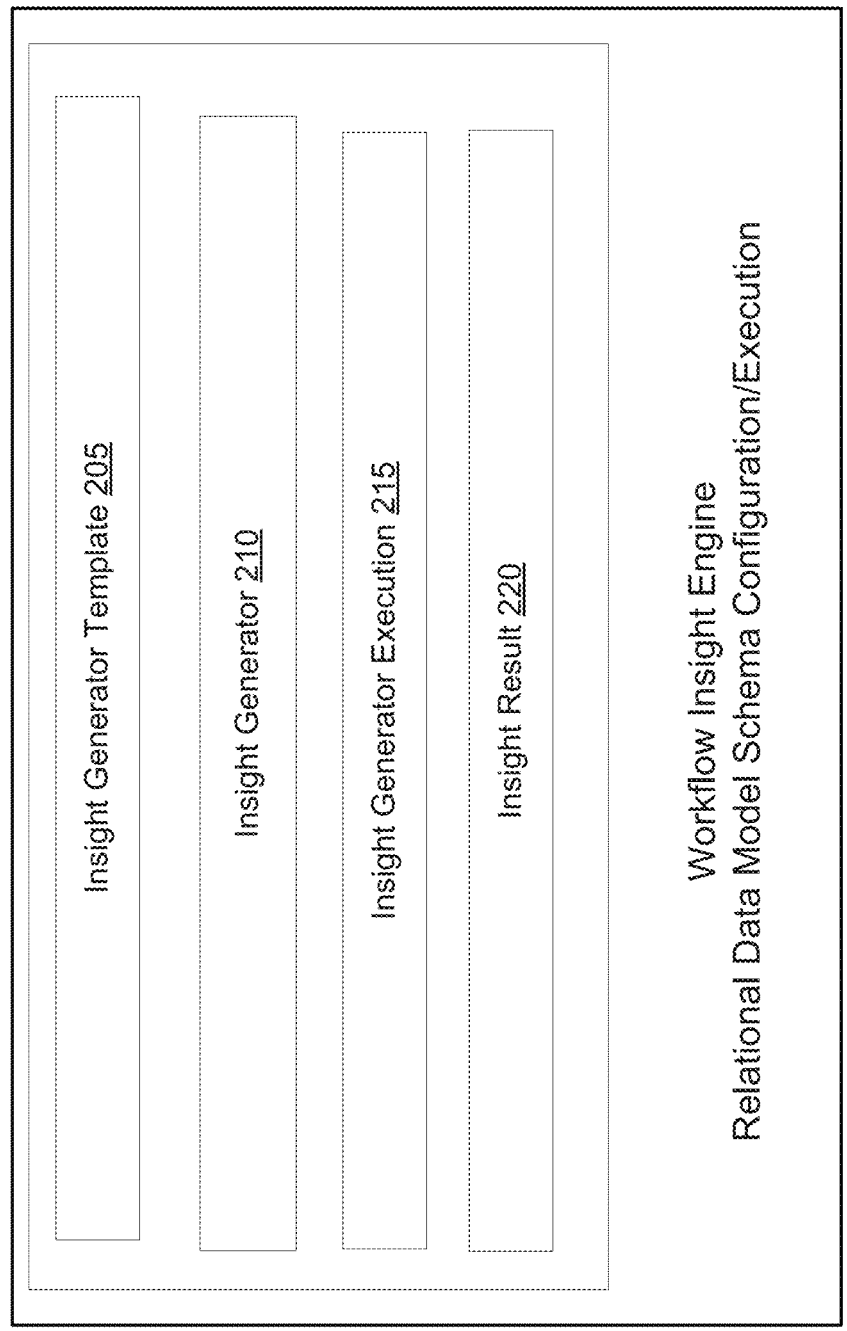
FIG. 2 is a block diagram of a configurable insight engine using a data model schema in accordance with an implementation.

FIG. 2 is a block diagram illustrating major components of an example of a configurable insight engine that uses a relational data model schema with structured data in accordance with an implementation. An insight generator template 205 provides template tables with fields that can be populated as part of a configuration process. The insight generator template 205 may be implemented in SQL and contain the configuration for an insight, referenced by the insight generator 210. A template describes what the insight result should be like and describes how the insight engine should construct the insight result. An insight generator template 205 is a configurable abstract representation of an insight operation which may, for example, specify level, category, input field(s), output field(s), message(s), and SQL operations. The level may be used to determine how an insight can be viewed, such as by indicating the scope of data to be included in an insight execution result. A category may, for example, include complexity, efficiency, quality, and friction as examples. The input field(s) represent parameters that are expected to be provided for the insight execution based on the insight generator template. The output field(s) defines output values are expected to be available as part of insight message resolution. The message(s) may represent messages expected to be resolved for each insight execution.

An insight generator 210 may be implemented in SQL and generates a concrete representation of an insight to be evaluated based on a customized template. It describes the active statuses for insights and describes the input values for insights. Insight generator 210 instances are executed against a workflow database to generate insights. An insight generator execution module 215 may, for example, execute the query of the customized template and implement a map/reduce operation to fan out work. An insight result module 220 corresponds to the output in terms of a basic insight result, insight messages, and optional drilldown records representing, for example, the individual workflows, paths and steps associated with an insight.

Figure 3:
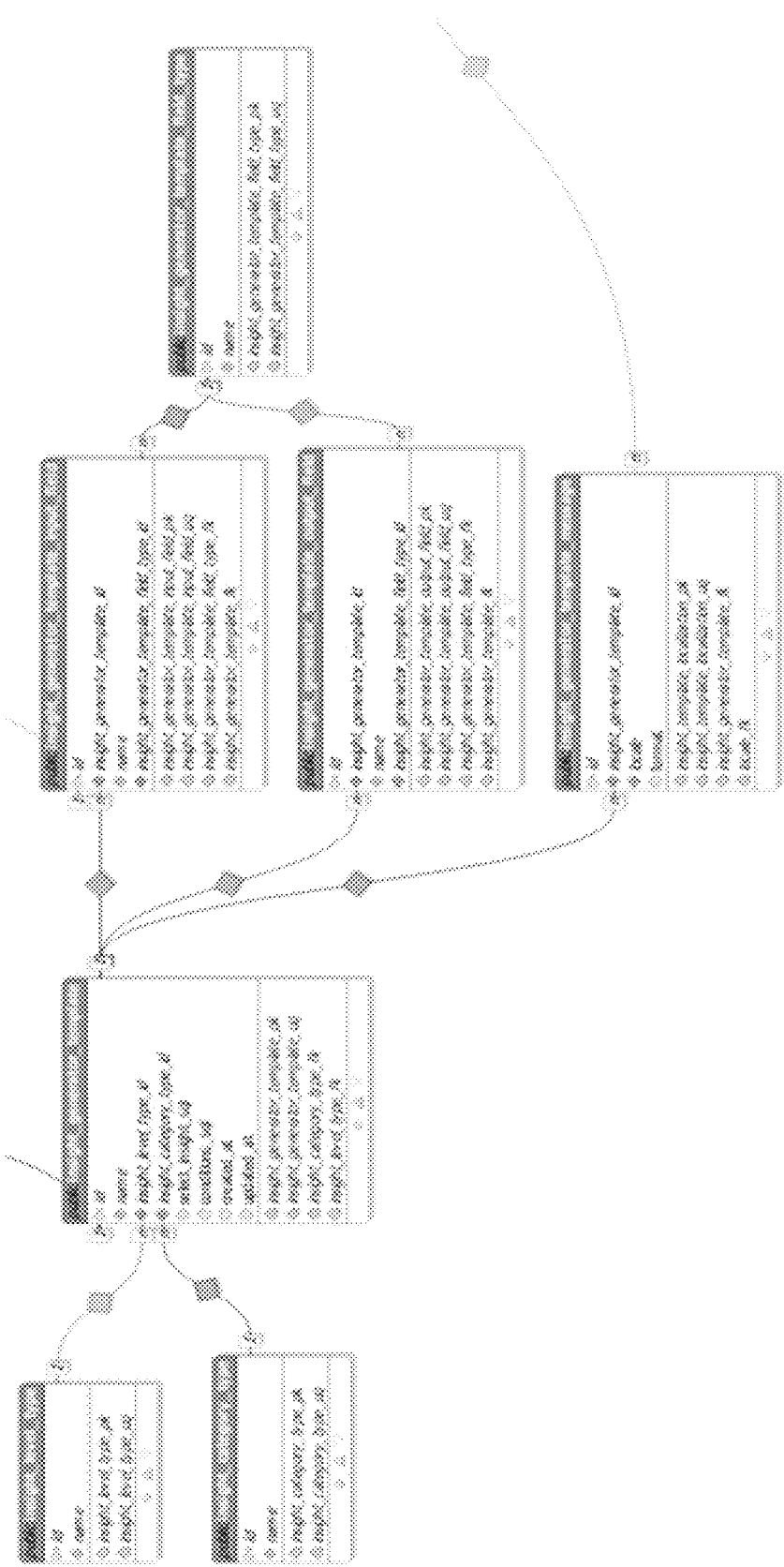
FIG. 3 illustrates an example of a template for a configurable insight engine in accordance with an implementation.

FIG. 3 illustrates a data model schema with customizable tables for insight level type, insight category type, insight generator template, insight generator template input field, insight generator template output field, insight generator template message, and insight generator template field type.

Figure 4:
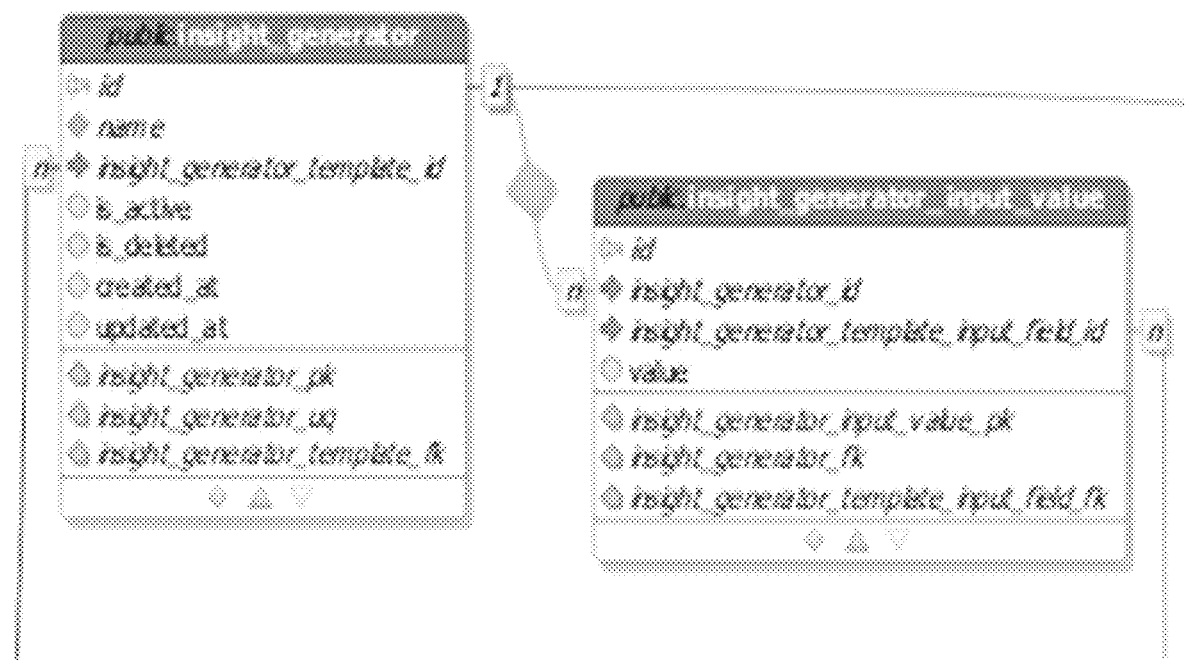
FIG. 4 illustrates an example of the configured insight template in accordance with an implementation.

FIG. 4 relates to an insight generator instance. An insight generator instance is a concrete executable representation of an insight and refers to a template and provides the values to use for each input field defined by the template.

Example Methods

Figure 5:
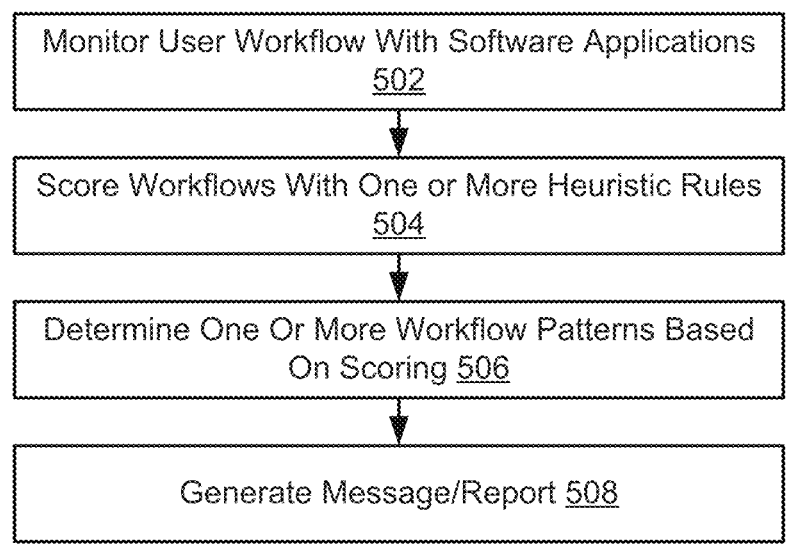
FIG. 5 is a flow chart of a method of generating workflow insights in accordance with an implementation.

FIG. 5 is a flowchart of a computer implemented method in accordance with an implementation. In block 502, a user workflow with one or more software applications is monitored. This may include, for example, collecting structured data about what user interface screens users are interacting with and information on mouse clicks and key strokes. For a given instance of a workflow, this may include path information and step information. While one instance of a workflow may be monitored, more generally multiple instances may be monitored over a selected time period (e.g., one month). In block 504, the workflow is scored with one or more heuristic rules. In block 506, one or more workflow patterns are determined based on the scoring. For example, the scores may be compared to pre-selected threshold values to identify potential problems or issues. For example, scoring against threshold values may indicate that the workflow has efficiency problems, quality problems, etc. Overall metrics may also be considered, as well as other considerations related to workflow patterns. In block 508, a message/report is generated providing one or more insights about the workflow. The message report may, for example, include individual scores, assessment of workflow performance issues, recommendations, and optional drilldown data.

Figure 6:
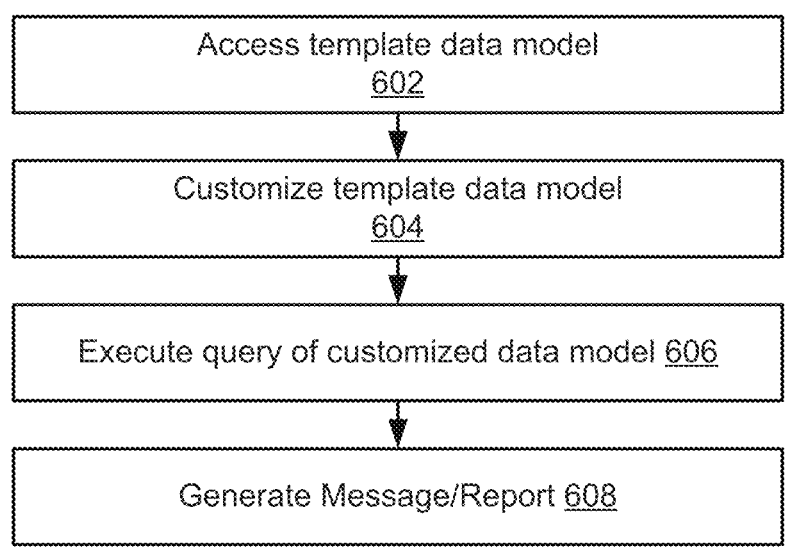
FIG. 6 is a flowchart of a method of configuring and using an insight engine in accordance with an implementation.

FIG. 6 is a flowchart of a method of configuring a structured data model schema query to implement an instance of an insight engine in accordance with an implementation. In block 602, a template data model is accessed. In block 604, the template data model is customized. In block 606, a query is executed based on the customized data model representation. In block 608, a message/report is generated based on the results of the query.

Figure 7:
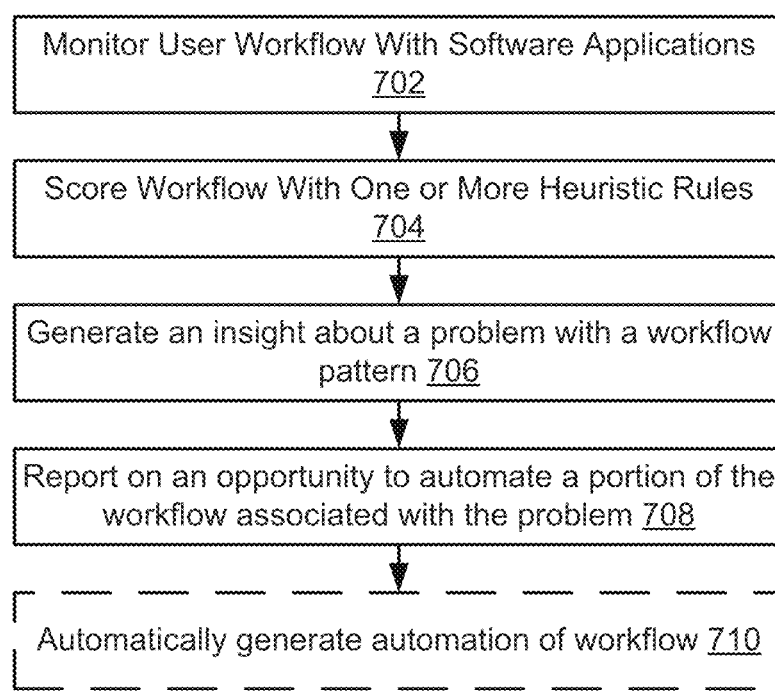
FIG. 7 is a flowchart of a method of identifying workflows that would benefit from automation in accordance with an implementation.

FIG. 7 is a flowchart of a method of identifying workflows for automation. In block 702, a user workflow with software applications is monitored. In block 704, the workflow is scored with one or more rules. In block 706, an insight is generated about a problem with a workflow pattern. In block 708, an opportunity to automate a portion of the workflow is reported. In block 710, in some circumstances the system may optionally automatically generate an automation based on suggestions from AI/ML engine 154. For example, if path diversity exceeds a threshold is too high an AI engine could be trained to generate a suggested automation of a portion of the workflow. That is an AI/ML engine 154 could be trained to generate a suggested automation for a variety of common workflow optimization or standardization scenarios that occur for particular types of work tasks.

Figure 8:
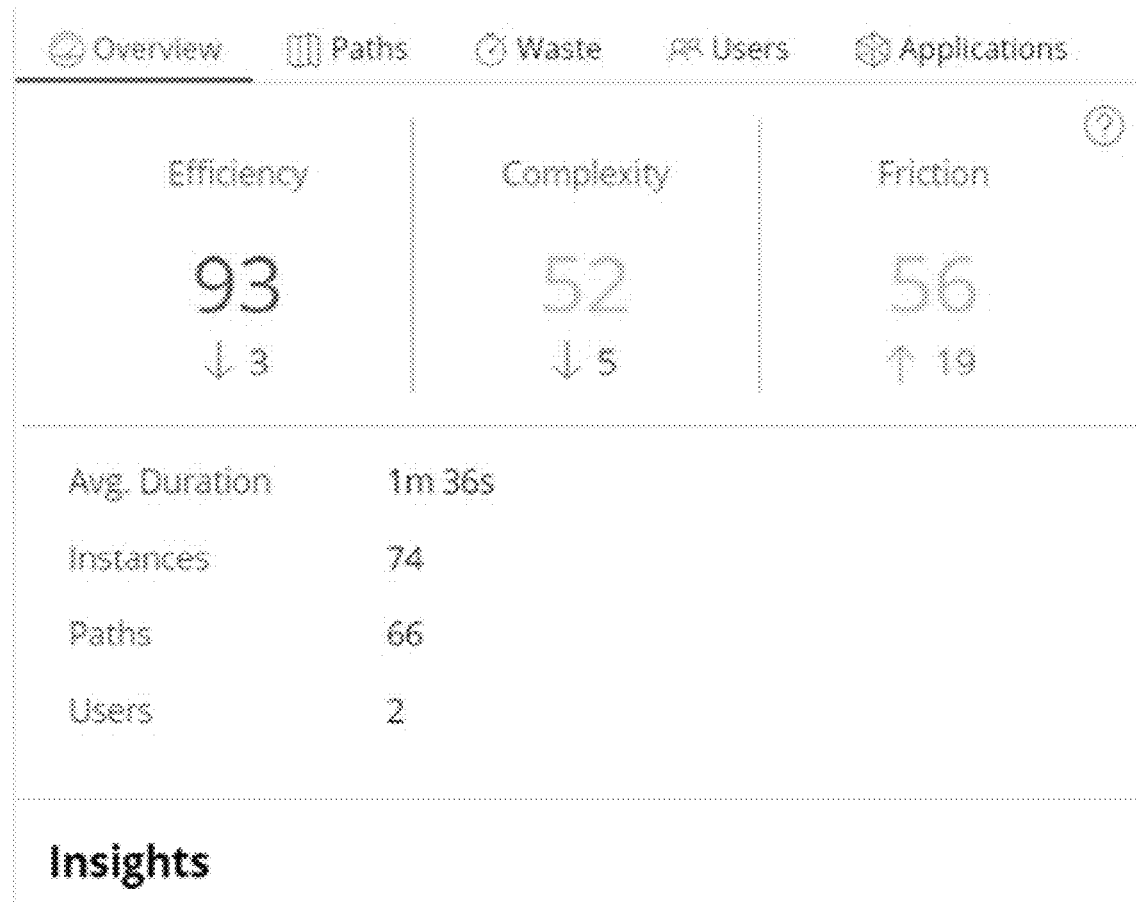
FIG. 8 is an example user interface insight message in accordance with an implementation.

FIG. 8 is an example of an insight message in accordance with an implementation. A message may, for example provide scores for metrics like efficiency, complexity, friction, and waste. It may also provide information on instances, paths, users, and applications. It may also indicate trend data, such as changes over previous reporting periods for metrics like efficiency, complexity, friction, waste, etc. It may also summarize insights, such as summarizing workflows or paths having specific concerns or issues. It may also generate recommendations for workflows that might benefit from a software upgrade or workflow automation.

This type of insight reporting permits analysts to consider improvements, which may include better training, software upgrades, or automation opportunities for some workflows.
Example Scoring Algorithms The scoring may be based on heuristic algorithms to score attributes of a workflow. Additional threshold values may be defined, such as examining when one or more metrics exceed a threshold value. The scoring can be based on heuristic rules based on considerations of what types of workflow choices are likely to be productive or efficient choices. However, more generally the scoring algorithms could be derived from a large data set (e.g., by monitoring and evaluating differences in workflows between different users). As many companies have workflows designed to achieve similar or identical tasks, an AI/ML engine 154 could be trained to customize the scoring for particular tasks when performed by different organizations/departments. That is, an AI/ML engine 154 could be trained to customize scoring algorithms for different organizations/departments.

In one implementation, an "insight" is a recognition of a discoverable pattern in one or more workflows that can be identified using one or more algorithms applied to a set of structured data derived from the time-series data. An individual score, for example, may relate to the efficiency of a workflow and a combination of scores relates to overall efficiency. Similarly, an individual score may relate to quality of workflow with a combination of quality scores relating to overall quality. A workflow can thus include one or more instances of a particular type of workflow associated with a task. A workflow can consist of one or more paths. A workflow instance can include one or more steps. A path can include one or more steps.

In some implementations, a standard set of insights is supported. Additionally, in some implementations, dynamic configuration and execution of insights may be supported.

In some implementations, individual scores may be expressed as a simple mathematical function with variables selected to reflect an algorithm developed based on analyzing a data set of workflows to perform common work tasks. For example, in an insurance claims environment, data on the workflows of individual agents may be collected and analyzed to understand how software applications are being used in practice by users. That is, individual scoring algorithms can be heuristic algorithms developed in view of real-world data. The heuristic algorithms can also be based on an understanding of how a variety of commonly used software applications work in practice when applied to work scenarios such as customer service environments.

The scoring may, for example, use a small number of variables to represent real-world variations in how well users perform tasks with a workflow that includes options such as options for using different software applications, navigating between different software screens, entering data, etc. Individual scores may, for example, be in the form of a number (e.g., 0 to 100) or a percentage. However, threshold scoring may also be used to assign a grade or indicate the presence or absence of a potential problem (e.g., pass/fail, A, B, C, D, F)

For example, an insurance company having a group of insurance claim agents may provide each claim agent with a personal computer, work-related software applications, and training on how to use the software to perform a variety of different claim-related tasks. Individual scores may, for example, be expressed as a percentage or a number. In some implementations, the score is compared with a threshold number to generate an insight. For example, the score may be compared with a threshold in a logical if-then statement to grade or judge a workflow.

As an illustrative example, a scoring algorithm may penalize high levels of use of some types of software applications over other types of software applications. The penalty may also take into account use of specific software applications at specific points in a workflow. For example, a workflow scoring may penalize a workflow or a path that contains an excess time or excess number of steps in some types of applications that may pose quality or efficiency risks for performing some types of tasks. For example, the Microsoft® Excel® software application is not a structured application that users can be guided through in a standardized way. The entries in an Excel® spreadsheet depend on manual user input, which requires user effort and which has a propensity for errors.

In one implementation, an algorithm identifies excessive use of a spreadsheet application in terms of duration of factors such as average duration of use, empirically derived constants, and a number of steps as a simple If-then-else logical statement.

In this example, an insight may be triggered if a workflow contains Excel® usage past an established threshold. The numbers for the thresholds may be empirically determined from a sample of customer data from which mean and standard durations of using Excel® in a workflow may be determined. For example, a sample of customer data may be used to determine a mean duration plus two standard deviations of duration for a single step (i.e. a screen) while excluding the top 1% to control for outliers. This threshold may be increased with the number of steps for the given workflow up to a maximum time determined using the mean plus two standard deviations of duration among all workflows while also excluding the top 1%. If this threshold is passed, then an insight message is generated of "Workflow or path contains excess time in Excel". Furthermore, if this threshold is passed and a separate threshold for Excel usage as the first or last application in a workflow is also passed, an insight message is generated of "Workflow or path contains excess time in Excel.".

There are several reasons why excessive use of a spreadsheet application may be penalized. In some workflows, excess time or an excess number of steps in a spreadsheet application may be indicative of a user workflow that's not taking full advantage of other structured applications a company may provide to its employees, such as some CRM applications. It may also alternatively indicate a need for greater training for users to efficiently use an unstructured spreadsheet application. But it may also indicate opportunities for software upgrades or automation to minimize or eliminate the need for a workflow to use an unstructured application like a spreadsheet application.

A scoring system can penalize use of unstructured applications in general and penalize use at specific points in a workflow to reflect how ordinary users may waste time or generate errors when using unstructured applications like spreadsheets. A grading system may have a logical condition with pre-selected thresholds indication when one or more un-structured applications are used, relative to other structured applications, in an excessive manner.

Similarly, use of a note-taking application may be penalized. The reason for this is that some software applications include automatic note taking features, such that use of a separate note taking application by an employee could indicate one of two possibilities: 1) the employee is not using built in note taking aspects of other programs; 2) there are opportunities for software upgrades to improve the workflow; or 3) there are opportunities to automate out labor intensive or error-prone use of separate note-taking applications.

Another example of an insight definition is a majority waste insight. A waste insight is an insight about an excessive amount of time being spent in unproductive idle time in activities unrelated to a workflow. For example, a user may have news applications, email, or social media applications running on their computer that are not related to the workflow. In some situations, a user interrupts a workflow with time spent in unproductive applications, such as viewing their personal email, reading the news or stock reports, viewing social media, etc.

In one implementation, a waste duration may be defined as time spent in an unknown application or a non-work application between steps in a workflow. For example, if a workflow has two steps each using different applications, a user might complete the first step in application number one but then switch browser tabs to a non-work related application for a while before switching back to the second application to complete the second step. A waste instance may be identified if the percentage of unproductive time to total time exceeds a selected threshold.

$$IF \frac{\text{Waste Duration}}{\text{Total Duration}} > \text{Input Threshold}$$

$$AND(\text{unknown duration} > \text{nonwork duration})$$

$$AND(\text{unknown duration} > \text{idle duration})$$

$$AND(\text{unknown duration} > \text{wait duration})$$

An efficiency score may be generated to reflect a percentage of user time spent on productive tasks. For example, an efficiency score may be based on production time, other time, and total execution time as follows:

$$100 * \frac{\text{Production Time} + \text{Other Time}}{\text{Total Execution Time}}$$

This assumes that there are four categories for the use of software applications, including: productive, other work, non-work, and unknown. The overall efficiency score may, for example, be compared against a threshold efficiency score, historical efficiency scores for the same user, or efficiency scores of other users.

A complexity score penalizes workflows based on how many unique screens workflows contain. This is because a workflow that involves many different applications and screens is complex in that it is likely to involve more time, effort, and training for a user to successfully complete. Conversely, in a less complex workflow an employee only has to navigate or enter information over a small number of different unique screens. Thus a complexity score may include a factor reflecting the number of unique screen to total screens (e.g., unique app screens/total app screens). However, a correction factor may be included for short workflows. Empirically, short workflows of between 2 to 7 steps are still comparatively simple.

$$100 - \left[ 100 * \left( \frac{\text{Unqiue App Screen}}{\text{Total App Screen}} \right) * \frac{\min(\text{Total App Screen}, \min(\textit{Num Steps} * 2, 6))}{\min(\textit{Num Steps} * 2, 6)} \right]$$

A friction score is defined as a level of manual effort needed by an employee to navigate through the workflow based on the combination of keypresses, clicks, and scrolls. A workflow with a minimum number of keypresses, mouse clicks, and scrolls requires less employee time and effort, and is also less prone to mistakes. In one implementation, the friction score is given as follows:

$$100 - \left[100 * \min\left(\frac{\text{Keypress} + \text{Clicks} + \text{Scrolls}}{\min(\text{Num Steps} * 36.5, 277)}, 1\right)\right]$$

An overall score may be defined based taking into account a combination of the previous scores.

$$\frac{\sum_{i=1}^{n} \frac{\text{num metrics instance } i \text{ w/scores} > \text{threshold}}{\text{num metrics instance } i}}{n}$$

A data movement score may be used to identify workflows having too many copies and pastes. Copies and pastes among applications or screens have a potential for generating errors and is cumbersome. Excess copies and pastes may, for example, indicate an opportunity for automation. In one implementation, copies are penalized up to the number of pastes. A data movement number may be generated as a simple mathematical function that includes a penalty function. In one implementation, sample data of workflows is used to determine a mean value, a standard deviation, and two standard deviations.

$$100 - \left[100 * \min\left(\frac{\min(\text{Copies, Pastes}) + \text{Pastes}}{\min(\text{Num Steps} * 0.702, 6.895)}, 1\right)\right]$$

In one implementation, an insight message is generated when a data movement number is less than a pre-selected threshold number. In one implementation, the numerator of the penalty term is the lesser of copies vs. pastes added to pastes. The numerator penalizes copies, but only up to the number of subsequent pastes. This reflects that the equation is concerned with data movement, which occurs when there is a copy and a subsequent paste. If there are more copies than pastes, there isn't data movement. The denominator increases with the number of steps. The 0.702 is merely an example based on a particular example of customer data regarding using a mean value of copies+pastes plus two standard deviations of copies+pastes for a single step (e.g., a single screen). The denominator increases with the number of steps in the workflow up to a maximum of 6.895, which is also based on an example of commercial data using the mean plus two standard deviations of copies plus pastes. The example coefficients may be varied for individual use cases, with the point being that in a particular workflow they would be based on one or more statistical measures regarding excessive data movement.

A path variability score may look at a cumulative percentage instances of workflow captured a top number, N, of paths. For example, N may be selected to be a small number such N=20, but may be customized. If the percentage of the top N paths is less than a preselected threshold (e.g., 70%) it may indicate high path variability. A low path variability is desirable for a number of reasons. A low path variability often has a lower potential for errors and may also provide benefits for training, potentially less time to complete, etc.

FIG. 9 illustrates an example of a table showing three workflows, paths, production time execution time, and efficiency. FIG. 10 shows a comparable table for the same workflows in terms of a friction score. FIG. 11 shows a comparable table for a complexity score. One aspect illustrated by these tables is that detailed information may be generated for analysts to drill into insights at a fine level of details regarding the scoring of individual workflows and paths.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms. for example. "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method comprising:
    monitoring, via an insight engine, instances of a workflow associated with user-interactions with two or more different user interfaces of two more different software applications used in a sequence of keystrokes and mouse clicks navigating a plurality of screens to perform a work task having a sequence of steps;
    scoring, via the insight engine, the workflow based on at least one scoring rule to evaluate the workflow;
    generating insights on workflow patterns identified by the scoring to identify opportunities to automate the workflow; and
    utilizing a machine learning model to automate the workflow based on the identified opportunities.

2. The computer-implemented method of claim 1, wherein the scoring comprises generating a metric for the workflow associated with at least one of: 1) an efficiency metric of the workflow, 2) a waste metric of the workflow associated with a user interrupting a workflow with non-work related activities; 3) a complexity metric of the workflow, and 4) a friction metric indicative of a level of user effort associated with keystrokes and mouse clicks required by the workflow.

3. The computer-implemented method of claim 1, wherein the scoring comprises scoring the workflow based on a determination that the workflow uses a software application associated with a risk of user error or unnecessary user steps.

4. The computer-implemented method of claim 1, wherein the scoring comprises scoring the workflow based on a user using an unstructured application for at least one step of the workflow.

5. A computer-implemented method comprising:
    monitoring, via an insight engine, instances of a workflow associated with user-interactions with two or more different user interfaces of two or more different software applications in a sequence of keystrokes and mouse clicks navigating a plurality of screens to perform a work task having a sequence of steps;
    scoring, via the insight engine, the workflow based on at least one scoring rule to evaluate the workflow, wherein the scoring comprises generating a workflow path variability score based on a variability in different paths taken in different instances of the workflow;
    generating insights on workflow patterns identified by the scoring;
    in response to the workflow path diversity exceeding a threshold, utilizing a machine learning model to automate the workflow.

6. A computer-implemented method comprising:
    monitoring, via an insight engine, instances of a workflow associated with user-interactions with two or more different user interfaces of two or more different software applications used in a sequence of keystrokes and mouse clicks navigating a plurality of screens to perform a work task having a sequence of steps;
    scoring, via the insight engine, the workflow based on at least one scoring rule to evaluate the workflow, wherein the scoring comprises generating a data movement score associated with copy and paste user interface operations of the workflow;
    generating insights on workflow patterns identified by the scoring to identify opportunities to automate the workflow; and
    utilizing a machine learning model to automate the workflow based on the identified opportunities.

7. The computer-implemented method of claim 1, wherein the scoring comprises generating an efficiency score to reflect the fraction of time in a workflow in which productive work is performed.

8. The computer implemented method of claim 1, wherein the scoring comprises generating a complexity score based in part on a number of unique user interface screens in a workflow.

9. A computer-implemented method comprising:
- monitoring, via an insight engine, instances of a workflow associated with user-interactions with two or more different user interfaces of two or more different software applications used in a sequence of keystrokes and mouse clicks navigating a plurality of screens to perform a work task having a sequence of steps;
- scoring, via the insight engine, the workflow based on at least one scoring rule to evaluate the workflow, wherein the scoring comprises generating a friction score indicative of a burden on user to navigate and enter data and commands in user interfaces through keystrokes and mouse clicks;
- generating insights on workflow patterns identified by the scoring to identify opportunities to automate the workflow; and
- utilizing a machine learning model to automate the workflow based on the identified opportunities.

10. A computer-implemented method, comprising:
- monitoring, via an insight engine, instances of a workflow associated with user-interactions in a sequence of keystrokes and mouse clicks with two or more different user interfaces of two or more different software applications used to complete a work task having a sequence of steps;
- scoring, via the insight engine, the workflow based on at least one scoring rule to evaluate the workflow;
- generating, via the insight engine, an insight about at least one problem with at least one workflow pattern identified by the scoring to identify opportunities to automate the workflow;
- reporting on the identified opportunities, based on the insight, to automate at least a portion of the workflow associated with the at least one problem; and
- utilizing a machine learning model to automate the workflow based on the identified opportunities.

11. The computer implemented method of claim 10, wherein the scoring comprises at least one of: 1) an efficiency metric of the workflow, 2) a waste metric of the workflow associated with a user interrupting a workflow with non-work related activities; 3) a complexity metric of the workflow, and 4) a friction metric indicative of a level of user effort associated with keystrokes and mouse clicks required by the workflow.

12. The computer implemented method of claim 10, wherein the workflow comprises a sequence of steps performed using at least two different software applications.

13. A computer-implemented method, comprising:
- monitoring, via an insight engine, instances of a workflow associated with user-interactions in a sequence of keystrokes and mouse clicks with two or more different user interfaces of two or more different software applications used to complete a work task having a sequence of steps;
- scoring, via the insight engine, the workflow based on at least one scoring rule to evaluate the workflow, the scoring further comprising generating an algorithm for the scoring based on analyzing workflow instances, identifying statistical metrics associated with the analyzed workflow instances, and generating a heuristic scoring rule based at least in part on the statistical metrics;
- generating, via the insight engine, an insight about at least one problem with at least one workflow pattern identified by the scoring to identify opportunities to automate the workflow; and
- utilizing a machine learning model to automate the workflow based on the identified opportunities.

* * * * *